United States Patent
Ubagai et al.

(10) Patent No.: US 6,223,858 B1
(45) Date of Patent: May 1, 2001

(54) TRANSMISSION LUBRICATING DEVICE

(75) Inventors: Toshikazu Ubagai; Shinobu Yoneda, both of Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 09/213,530

(22) Filed: Dec. 17, 1998

(30) Foreign Application Priority Data

Dec. 26, 1997 (JP) ...................................... 9-367681

(51) Int. Cl.$^7$ ...................................................... F01M 1/00
(52) U.S. Cl. ........................ 184/11.2; 184/6.12; 184/11.1
(58) Field of Search ............................. 184/6.12, 13.1, 184/11.2, 11.1, 11.4

(56) References Cited

U.S. PATENT DOCUMENTS

| | | | |
|---|---|---|---|
| 2,049,234 | * | 7/1936 | Thomas et al. ................. 184/6.12 X |
| 2,053,542 | * | 9/1936 | Vandervoort ..................... 184/6.12 X |
| 3,192,788 | * | 7/1965 | Fodrea ............................. 184/6.12 X |
| 4,222,283 | * | 9/1980 | Nagy ................................ 184/6.12 X |
| 4,227,427 | * | 10/1980 | Dick ................................. 184/6.12 X |
| 4,896,561 | * | 1/1990 | Hayakawa et al. ............... 184/6.3 X |
| 5,456,129 | * | 10/1995 | Tane et al. ....................... 184/6.12 X |

FOREIGN PATENT DOCUMENTS

| 510856 | 2/1993 | (JP) . |
|---|---|---|
| 58120 | 2/1993 | (JP) . |

* cited by examiner

*Primary Examiner*—Thomas R. Hannon
*Assistant Examiner*—Colby Hansen
(74) *Attorney, Agent, or Firm*—Morrison Law Firm

(57) ABSTRACT

High and low speed gears of a vehicle transmission are selectively lubricated by transmission oil flung by a final ring gear. A first oil gutter directs the transmission oil to low speed gears when the transmission oil is flung at low speed. At higher speed, the transmission oil is flung past the first gutter to be received by a second gutter from which it flows to lubricate high speed gears.

5 Claims, 4 Drawing Sheets

TRANSMISSION LUBRICATING DEVICE

BACKGROUND OF THE INVENTION

This invention relates to a transmission lubricating device which supplies transmission oil selectively to high-speed and low-speed gearing in the transmission, depending on engine speed.

A transmission, or a similar device, is used in a vehicle to supply a force from the vehicle's engine to the wheels that depends on the driving conditions. The transmission can be set to one of several settings or "speeds". The transmission includes an input shaft and a counter shaft situated in parallel. For each speed of the transmission, an input gear on the input shaft engages a corresponding counter gear on the counter shaft. A final drive gear, mounted at the end of the counter shaft near the engine, engages a final ring gear mounted on a differential case of a differential gearing. While rotating, the final ring gear scoops up transmission oil inside the transmission case, and sends the oil to lubricating devices which supply oil to the input and counter gears. Each input and counter gear is equipped with a lubricating device.

Examples of this type of transmission lubricating device are disclosed in Japanese Utility Model Laid-Open Publication Number 5-10856 and Japanese Utility Model Laid-Open Publication Number 5-8120. Japanese Utility Model Laid-Open Publication Number 5-10856 discusses a transmission in which the differential gear case is integrated with the transmission case. An oil guide on the side of a differential drive gear guides the transmission oil scooped up by the differential drive gear to the upper portion of the differential gear case. An oil tank stores the oil received from the oil guide. The change gear and bearings can be adequately lubricated, and the surface of oil in storage in the differential gear case during driving can be lowered.

Japanese Utility Model Laid-Open Publication Number 5-8120 describes a transmission lubricating device wherein a speed change gear, located on the lower part of the transmission case, always remains engaged. An oil guide on the side of speed change gear guides transmission oil scooped up by the speed change gear to the upper part of transmission case. The guided transmission oil flows through an oil pathway into an oil supply pathway formed in the core of gear shift. The oil surface of the transmission oil in storage can be lowered, and the speed change gear and bearings remain adequately lubricated.

However, with the transmission lubricating device of the prior art, an oil pump and many pipes are necessary to supply transmission oil to each speed gear. Mechanical energy losses are large when the oil pump is driven, thereby reducing fuel efficiency. The transmission's cost is high due to the pump and the pipes, but also due to the large amount of space necessary for the layout.

OBJECTS AND SUMMARY OF THE INVENTION

It is therefore an object of the present invention to provide a transmission lubricating device that overcomes the limitations of the prior art.

It is a further object of the invention to provide a transmission lubricating device which automatically supplies oil to high-speed and low-speed gearing, depending on vehicle speed.

It is a still further object of the invention to provide a transmission lubricating device which employs first and second oil gutters. The first gutter is preferentially supplied with oil at low speed and the second gutter is preferentially supplied with oil at high speed. Oil from the first gutter lubricates low-speed gearing, while oil from the second gutter lubricates high-speed gearing.

Briefly stated, the present invention provides a transmission lubrication system in which high and low speed gears of a vehicle transmission are selectively lubricated by transmission oil flung by a final ring gear. A first oil gutter directs the transmission oil to low speed gears when the transmission oil is flung at low speed. At higher speed, the transmission oil is flung past the first gutter to be received by a second gutter from which it flows to lubricate high speed gears.

According to an embodiment of the invention, there is provided a transmission lubricating device, comprising: an input shaft for driving by an engine, a counter shaft parallel to the input shaft, a first plurality of gears on the input shaft, a second plurality of gears on the counter shaft, the second plurality being selectively engageable with the first plurality to produce desired gear ratios, a final drive gear at an end of the counter shaft, a final ring gear engaging the final drive gear, the final ring gear being positioned to scoop up and fling transmission oil during rotation thereof, a first oil gutter adjacent the final ring gear receiving transmission oil scooped up by the final ring gear, a second oil gutter further away from the final ring gear than the first oil gutter, the first oil gutter including a first surface directing oil during low speed operation to low speed gears, the first oil gutter including a second surface directing oil to the second oil gutter during high speeds, and the second oil gutter including a receptacle for feeding oil received therein to high speed gears.

According to a feature of the invention, there is provided a transmission lubricating device comprising: a gear, the gear being rotatable at a speed related to a vehicle speed, the gear being positioned to scoop up and fling transmission oil during operation of the vehicle, a first gutter, the first gutter being positioned to receive transmission oil and to direct the transmission oil to low speed gears when the transmission oil is flung at low speed, a second gutter, and the second gutter being positioned to receive transmission oil and to direct the transmission oil to high speed gears when the transmission oil is flung at high speed.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENTS

In this invention, when the vehicle travels at low speed, the final ring gear, having a rotational velocity that is related to vehicle speed, rotates relatively slowly. At low vehicle speed, transmission oil is splashed or scooped up by the final ring gear preferentially into a first oil gutter that feeds lubricant to low speed gears. When the vehicle speed is high, the transmission oil is preferentially splashed to a second oil gutter which feeds lubricant to the high speed gears. Consequently, oil pumps, pipes, and the like are unneeded to lubricate each speed gear. With fewer parts needed in the transmission, the layout space is reduced. This reduces the cost of the transmission and improves fuel efficiency by eliminating parts causing mechanical energy loss.

Figure 1:
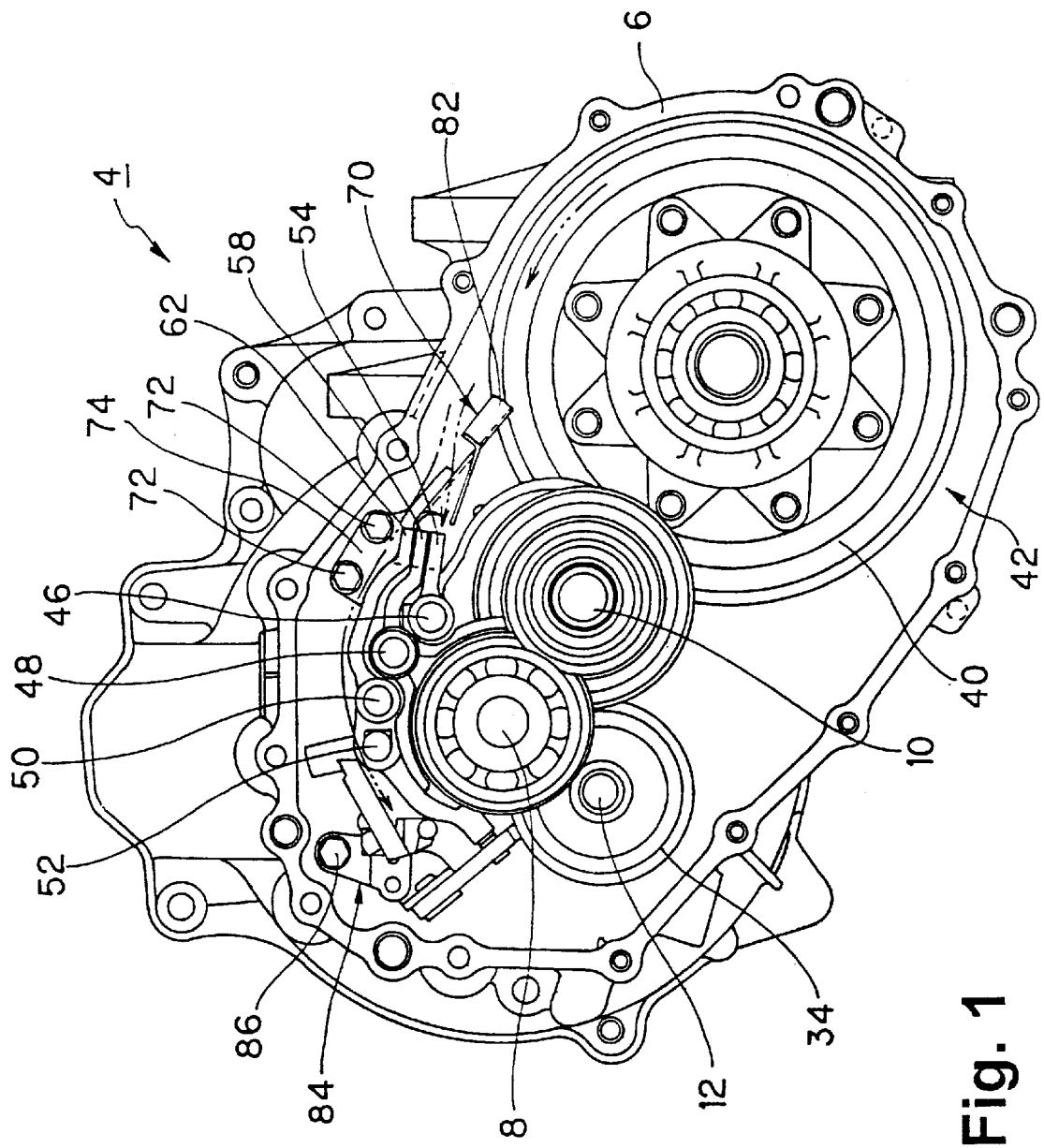
FIG. 1 is a transverse cross section of a transmission according to an embodiment of the invention.
Figure 2:
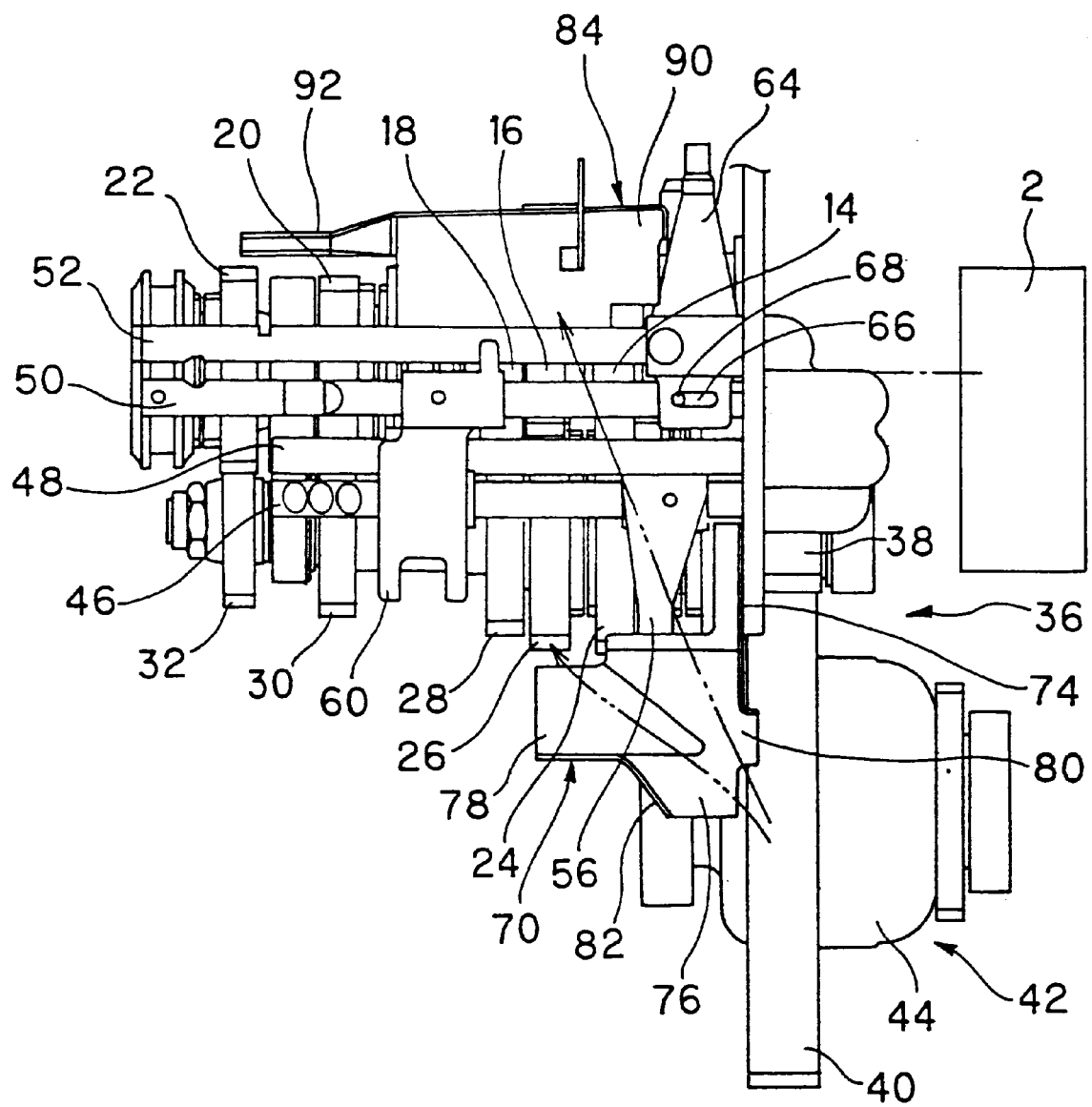
FIG. 2 is a plan view of the transmission of FIG. 1.

Referring to FIGS. 1 and 2, an engine 2 of a vehicle is connected to a transmission 4 contained inside a transmission case 6. The speed relationship between engine 2 and the rotation speed of the vehicle drive wheels is controlled by a speed reduction mechanism shown generally at 36. An input shaft 8 of speed reduction mechanism 36 is driven by a crank shaft (not shown) of engine 2. A counter shaft 10 and a reverse shaft 12 are parallel to input shaft 8. As oriented according to FIG. 1, counter shaft 10 is lower and to the right of input shaft 8. Reverse shaft 12 is lower and to the left of input shaft 8. A plurality of input gears are disposed on input shaft 8. Listed in order leading away from engine 2, are the low speed gears: 1-speed input gear 14 and 2-speed input gear 16, both of which are fixed to input shaft 8; and 3-speed input gear 18 and 4-speed input gear 20, which are free to rotate. These are followed by a high speed gear, 5-speed input gear 22, which is also free to rotate.

Counter shaft 10 carries a corresponding plurality of counter gears. Listed in order leading away from the engine, they are 1-speed counter gear 24, 2-speed counter gear 26, 3-speed counter gear 28, 4-speed counter gear 30, and 5-speed counter gear 32. Each of these counter gears engages the input gear of the same speed number. The 1-speed and 2-speed counter gears can rotate freely, whereas the 3-speed, 4-speed, and 5-speed counter gears are fixed to counter shaft 10.

Reverse shaft 12 carries a reverse idler gear 34.

A small-diameter final drive gear 38 is fixed to the end of counter shaft 10 nearest engine 2. A final ring gear 40, with a large radius, engages final drive gear 38. Final ring gear 40 is anchored to a differential case 44 of a differential gearing 42. Differential gearing 42 drives the two front wheels of the vehicle in a conventional manner. Final ring gear 40 rotates at a speed proportional to vehicle speed. As final ring gear 40 rotates, it splashes or scoops up the lubrication oil inside transmission case 6.

Counter shaft 10 is located between input shaft 8 and differential gearing 42. Final speed reduction mechanism 36 is between counter shaft 10 and differential gearing 42. Final speed reduction mechanism 36 and differential gearing 42 are placed on the same side of the transmission near engine 2.

A low speed shift shaft 46, a high speed shift shaft 48, a 5-speed reverse shift shaft 50, and a 5-speed reverse shift guide shaft 52 are placed parallel to input shaft 8 near the upper portion of the input gears. These are supported by transmission case 6.

A low speed shift yoke 54 and a low speed shift fork 56 are connected on low speed shift shaft 46. Similarly, high speed shift shaft 48 carries a high speed shift yoke 58 and a high speed shift fork 60. A 5-speed reverse shift yoke 62 is disposed on 5-speed reverse shift shaft 50. There is a reverse shift arm 64 on 5-speed reverse shift shaft 50 and 5-speed reverse shift guide shaft 52. Reverse shift arm 64 is supported at the base of 5-speed reverse shift shaft 50 by a spring pin 68 which passes through a slotted hole 66.

A first oil gutter 70 is attached to transmission case 6 between input shaft 8 and differential gearing 42, adjoining final ring gear 40 and above counter shaft 10. First oil gutter 70 is tilted to supply transmission oil scooped up by final ring gear 40 to low speed gears such as 2-speed and 3-speed counter gears 26 and 28 during low speed rotation of final ring gear 40. During high speed rotation of final ring gear 40, the oil reaches first oil gutter 70 with a high enough velocity to travel past first oil gutter 70 and be directed to a second oil gutter 84. Second oil gutter 84 supplies transmission oil to high speed gears such as 5-speed input gear 22. During high-speed travel, little, if any, transmission oil is supplied to the low-speed gears, because its velocity is too high to travel down the slope of first oil gutter 70. Similarly, during low-speed travel, the oil entry velocity is too low to travel to second oil gutter 84. Instead, the lower-velocity oil passes along first oil gutter to lubricate the low-speed gears. The changeover between low-speed and high-speed lubrication is automatic.

Figure 3:
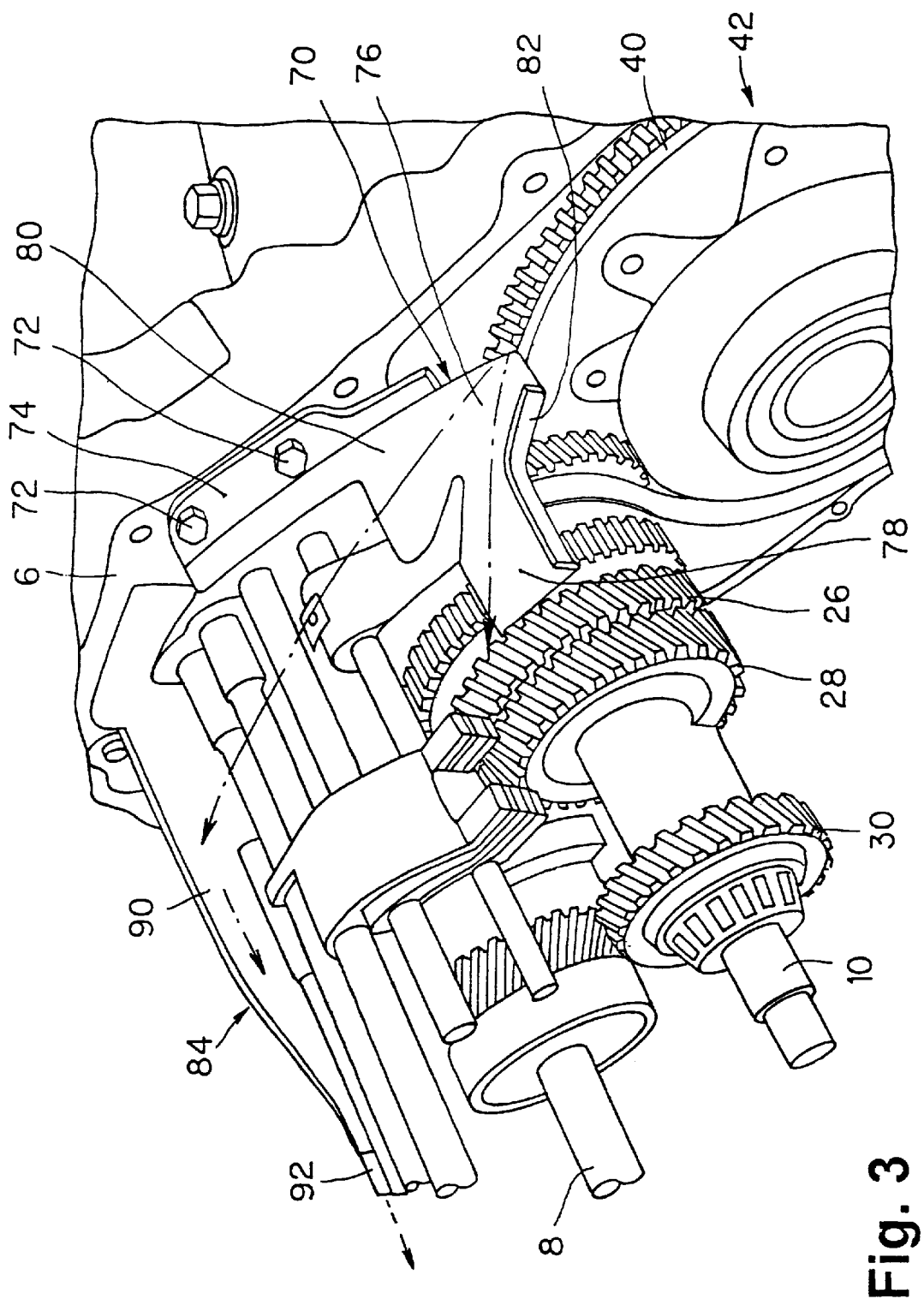
FIG. 3 is a perspective view of the transmission of FIG. 1.
Figure 4:
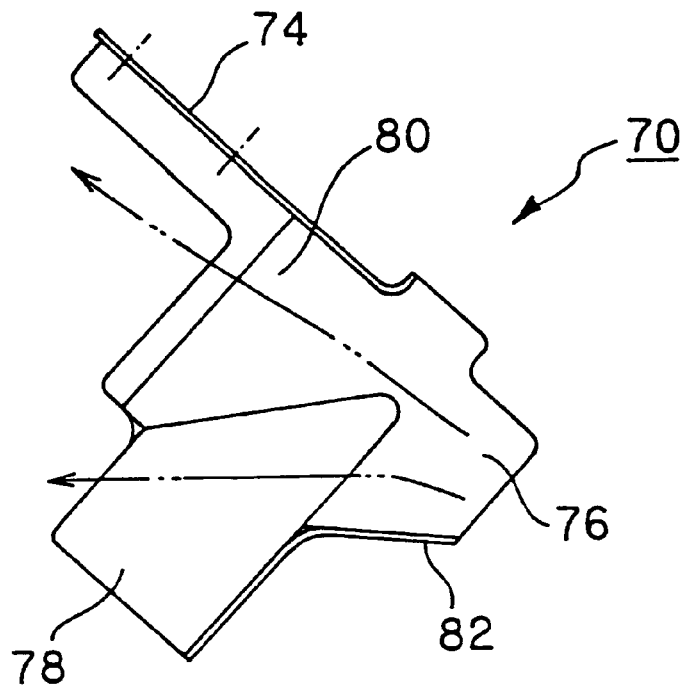
FIG. 4 is a plan view of a first oil gutter.

Referring to FIGS. 3 and 4, first oil gutter 70 includes a first attachment piece 74 attached to transmission case 6 by bolts 72. An oil directing surface 76 is adjacent final ring gear 40 to receive transmission oil scooped up by rotation of final ring gear 40. A low speed incline surface 78 extends toward 2-speed and 3-speed counter gears 26 and 28. Low speed incline surface 78 is slightly lower than oil directing surface 76. It will be noted from the double-dash curved line that the path of transmission oil curves at low speed. A high speed incline surface 80 on oil directing surface directs high-speed transmission oil which has been scooped up by final ring gear 40 above the shift shafts 46, 48, 50, 52 and into second oil gutter 84. A splatter prevention piece 82 is placed upright at the edge of oil directing surface 76 and low speed incline surface 78. Splatter prevention piece 82 prevents transmission oil from falling in an undesired direction. During low and high speeds, oil directing surface 76 automatically separates the transmission oil scooped up by final ring gear 40 between low speed incline surface 78 and high speed incline surface 80. During high speed, first attachment piece 74 prevents transmission oil from splattering on the opposite side of each speed gear.

Second oil gutter 84 is attached to transmission case 6 farther from final ring gear 40 than first oil gutter 70.

Figure 5:
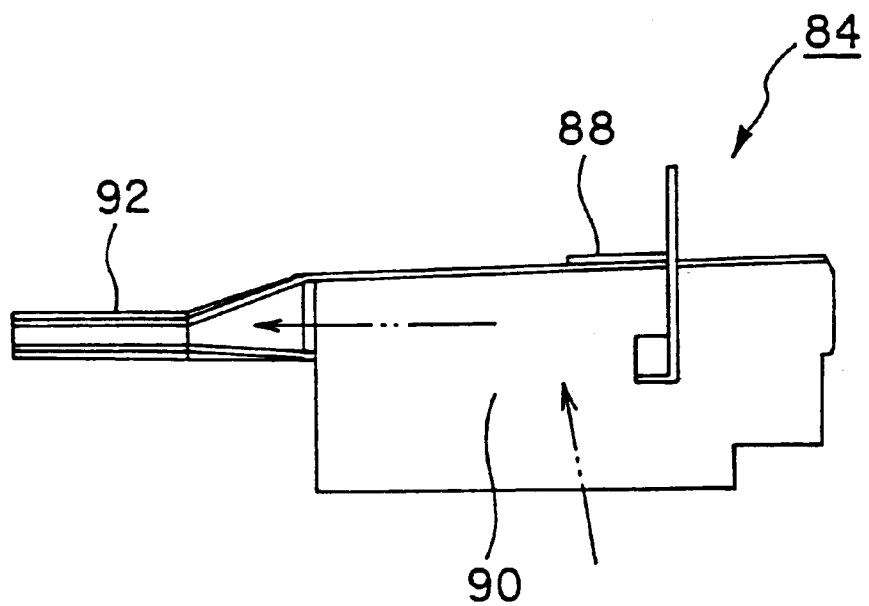
FIG. 5 is a side view of a second oil gutter.

Referring to FIG. 5, second oil gutter 84 includes a second attachment part 88 attached to transmission case 6 by a bolt 86. An oil receiving piece 90 intercepts oil directed to it by oil directing surface 76. The intercepted oil flows into an oil directing receptacle 92. An oil receiving piece 90 extends parallel to 5-speed reverse shift gear guide shaft 52. An oil directing receptacle 92 leads transmission oil to 5-speed input gear 22.

The embodiments operate as follows:

When the transmission operates at low speed, the rotation rate of final ring gear 40 is comparatively low. The speed at which final ring gear 40 projects the transmission oil is relatively low. Consequently, the transmission oil falls on low speed incline surface 78 formed slightly below oil directing surface 76 of first oil gutter 70. Lubrication oil on low speed incline surface 78 is supplied to 2-speed and 3-speed counter gears 26 and 28.

When the vehicle operates at high speed, the rotation rate of final ring gear 40 is high, and the speed at which final ring gear 40 projects the transmission oil is high. Consequently, the transmission oil is flung over oil directing surface 76 and on to high speed incline 80. Receiving piece 90 of second oil gutter 84 intercepts the oil, and directs it to oil directing receptacle 92. The oil flows out of oil directing receptacle 92 onto 5-speed input gear 22.

Both the amount and the speed of the lubrication oil scooped up by the final ring gear 40 with a large radius depends on its rotational rate. The faster that final ring gear 40 rotates, the farther the oil scooped up by final ring gear 40 is thrown. The lubrication oil scooped up by final ring gear 40 during low speed reaches only low speed incline surface 78, and is fed to the low speed gearing. During high speed, the oil is flung farther by way of high speed incline surface 80. The oil is flung far enough to reach second oil gutter 84 from which it travels to lubricate the high speed gears which are distant from final ring gear 40.

Oil pumps, installed in transmissions of the prior art, are unnecessary here. The number of parts in the transmission is reduced and the layout space is smaller. Therefore, the transmission is less expensive. Moving parts, such as oil pumps, which result in mechanical energy loss are eliminated, leading to improved fuel efficiency.

By the present invention as described in detail above, an oil gutter is placed adjacent the final ring gear. The oil gutter supplies transmission oil scooped up by final ring gear to low speed gears during low speeds and to high speed gears during high speeds. During high speeds, the higher-speed oil flow passes to a second oil gutter receives transmission oil from the first oil gutter and supplies the oil to high speed gears. The second oil gutter is located farther from the final ring gear than the first oil gutter. During low speeds, the transmission oil scooped up by the final ring gear is guided by the first oil gutter and is supplied to the low speed gears. During high speeds, transmission oil is guided to the second oil gutter by way of the first oil gutter and is supplied to the high speed gear. Separate parts such as oil pumps and pipes or the like are unnecessary. The number of parts is reduced and the layout space is smaller. The transmission is cheaper, and parts generating mechanical energy loss are eliminated, thereby improving fuel efficiency.

Having described preferred embodiments of the invention with reference to the accompanying drawings, it is to be understood hat the invention is not limited to those precise embodiments, and that various changes and modifications may be effected therein by one skilled in the art without departing from the scope or spirit of the invention as defined in the appended claims.

What is claimed is:

1. A transmission lubricating device, comprising:
    a plurality of low speed gears;
    a plurality of high speed gears;
    a final ring gear positioned to scoop up and fling transmission oil during rotation thereof;
    a first oil gutter adjacent said final ring gear receiving transmission oil scooped up by said final ring gear during low speed operation;
    a second oil gutter further away from said final ring gear than said first oil gutter receiving transmission oil scooped up and flung by said final ring gear past said first oil gutter during high speed operation;
    said first oil gutter including a first surface directing oil during low speed operation to said plurality of low speed gears;
    said first oil gutter including a second surface directing oil to said second oil gutter during high speeds; and
    said second oil gutter including a receptacle for feeding oil received therein to high speed gears, whereby lubrication transfers between said low speed gears and said high speed gears automatically depending on vehicle speed.

2. A transmission lubricating device of claim 1, wherein:
    said first surface includes a low speed incline surface which leads transmission oil to said low speed gears during low speed;
    said second surface includes a high speed incline surface which directs transmission oil to said second oil gutter during high speeds.

3. A transmission lubricating device of claim 1, wherein said second oil gutter includes:
    an oil receiving area where transmission oil from said first oil gutter is received; and
    an oil directing receptacle which guides transmission oil to high speed gears.

4. A transmission lubricating device comprising:
    a final ring gear;
    said final ring gear being rotatable at a speed related to a vehicle speed;
    said final ring gear being positioned to scoop up and fling transmission oil during operation of said vehicle;
    a first gutter;
    said first gutter being positioned to receive transmission oil and to direct said transmission oil to low speed gears when said transmission oil is flung at low speed operation of said vehicle;
    a second gutter; and
    said second gutter being positioned to receive transmission oil flung from said final ring gear past said first gutter and to direct said transmission oil to high speed gears when said transmission oil is flung at high speed operation of said vehicle, whereby lubrication transfers between said low speed gears and said high speed gears automatically depending on vehicle speed.

5. A transmission lubricating device according to claim 4 wherein:
    said first gutter includes a high speed incline surface; and
    said high speed incline surface being effective to direct transmission oil traveling at high speed to said second gutter.

* * * * *